US005983155A

United States Patent [19]

Bederna et al.

[11] Patent Number: 5,983,155
[45] Date of Patent: Nov. 9, 1999

[54] METHOD AND ARRANGEMENT FOR CONTROLLING AN INTERNAL COMBUSTION ENGINE

[75] Inventors: Frank Bederna, Korntal-Muenchingen; Martin Streib, Vaihingen, both of Germany

[73] Assignee: Robert Bosch GmbH, Stuttgart, Germany

[21] Appl. No.: 08/726,783

[22] Filed: Oct. 7, 1996

[30] Foreign Application Priority Data

Oct. 7, 1995 [DE] Germany ........................... 195 37 381

[51] Int. Cl.[6] ........................... G01M 15/00; F02D 41/22
[52] U.S. Cl. .......................................... 701/104; 73/119 A
[58] Field of Search .................................... 73/116, 117.2, 73/117.3, 118.1, 118.2, 119 A; 701/101, 104, 105, 99

[56] References Cited

U.S. PATENT DOCUMENTS 5,014,668 5/1991 Klenk et al. ............................ 123/399
5,495,841 3/1996 Gillbrand et al. ...................... 123/480
5,568,799 10/1996 Akazaki et al. ........................ 123/480
5,642,705 7/1997 Morikawa et al. ..................... 123/300
5,732,680 3/1998 Ninomiya et al. ...................... 123/481

FOREIGN PATENT DOCUMENTS 4243449 6/1994 Germany .

*Primary Examiner*—George Dombroske
*Attorney, Agent, or Firm*—Walter Ottesen

[57] ABSTRACT

The invention is directed to a method for controlling an internal combustion engine wherein an error state is detected and/or at least one error reaction is initiated when the injection, which is determined in dependence upon the detected load, and the injection time, which is corrected in dependence upon at least an additional operating variable, deviate from each other.

12 Claims, 4 Drawing Sheets

METHOD AND ARRANGEMENT FOR CONTROLLING AN INTERNAL COMBUSTION ENGINE

BACKGROUND OF THE INVENTION

U.S. Pat. No. 5,014,668 discloses at least partially driving an internal combustion engine with a lean air/fuel mixture. The air/fuel mixture signal is determined from the measured engine load (air mass, air quantity or intake pipe pressure) and the engine rpm. To form the fuel injection pulse, the air/fuel mixture signal is corrected with the pregiven desired value for the air/fuel ratio as well as with an output signal of a control unit. This control unit forms a control loop for adjusting the pregiven desired value for the air/fuel mixture. Furthermore, in the known control of the internal combustion engine, the air supply to the engine is adjusted in dependence upon the driver command by means of an electrically actuable power adjusting device such as an electrically actuable throttle flap.

For controls of this kind, a fuel quantity, which is increased with respect to the correct desired value, leads to impermissible torque increases. The increased fuel quantity can be a consequence of: an error in the detection of load (air mass measurement, air quantity measurement or intake pipe pressure measurement); an error in the air/fuel ratio control loop (such as a probe fault); an error in the signal processing in the electronic control apparatus; or, an error in the battery voltage correction of the injection time.

Here it should be noted that a fault in the detection of load, even for the conventional operation of an engine with a stoichiometric mixture, can lead to an impermissible increase of the engine torque. If, for example, the air mass sensor measures an air/fuel mixture signal which is too small (for example, too small by a factor of 1.5), the mixture would become too lean without mixture control and/or elevation adaption and the engine torque would, in this way, be rather too small than too great. However, conventional controls are equipped with mixture controllers and/or elevation adaption. For this reason, these functions compensate for the air mass error within their pregiven limits. The functions ensure that an essentially normal engine operation is provided notwithstanding this fault. If the situation develops that this dormant error in the air/fuel mixture signal is accompanied by an impermissible opening of the throttle flap in a system having electrical adjustment of the throttle flap, so that the air/fuel mixture increases, for example, by a factor of 1.5, this can lead to a non-detected increase of the engine torque by approximately this factor 1.5. This takes place when the monitoring of the electric control of the throttle flap is not carried out on the basis of the position signal but on the basis of an actual engine torque computed from the air/fuel mixture signal which is too small.

Measures for error detection are not described in the above-mentioned state of the art.

German patent publication 4,243,449 discloses an electronic control system for metering fuel to an internal combustion engine wherein the air/fuel mixture signal is corrected by a corrective signal for transition compensation (wall film correction). The corrected air/fuel mixture signal is, in turn, subjected to a further correction with respect to battery voltage to form the actual injection time. Measures for error detection are also not disclosed.

SUMMARY OF THE INVENTION

It is therefore an object of the invention to provide measures for detecting errors in the area of the formation of the fuel injection signal which can lead to an impermissible torque increase.

The method of the invention is for controlling an internal combustion engine including a mixture controller. The method includes the steps of: detecting the load on the engine and at least one additional operating variable of the engine including: battery voltage, desired air/fuel ratio, control signal of the mixture controller and a wall-film corrective value; determining a first injection time in dependence upon the detected load; correcting the first injection time in dependence upon at least one operating variable to obtain a second injection time; and, detecting a fault condition and/or initiating at least one fault reaction when the first and second injection times deviate impermissibly from each other.

With the method and arrangement of the invention, errors in the area of the formation of the injection time which could lead to an impermissibly high torque increase are reliably detected. Especially, erroneous metering of the fuel quantity is detected which could cause impermissible torque increases because of mixture enrichment for an engine driven with a lean mixture.

It is especially advantageous that dormant errors in the air/fuel mixture signal can be detected which could lead to an otherwise undetected increase of the engine torque when this dormant error is in combination with an erroneous adaptation in the mixture control loop resulting therefrom and/or in the elevation adaption and a further error.

It is especially advantageous that errors in the battery voltage correction can be reliably detected.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
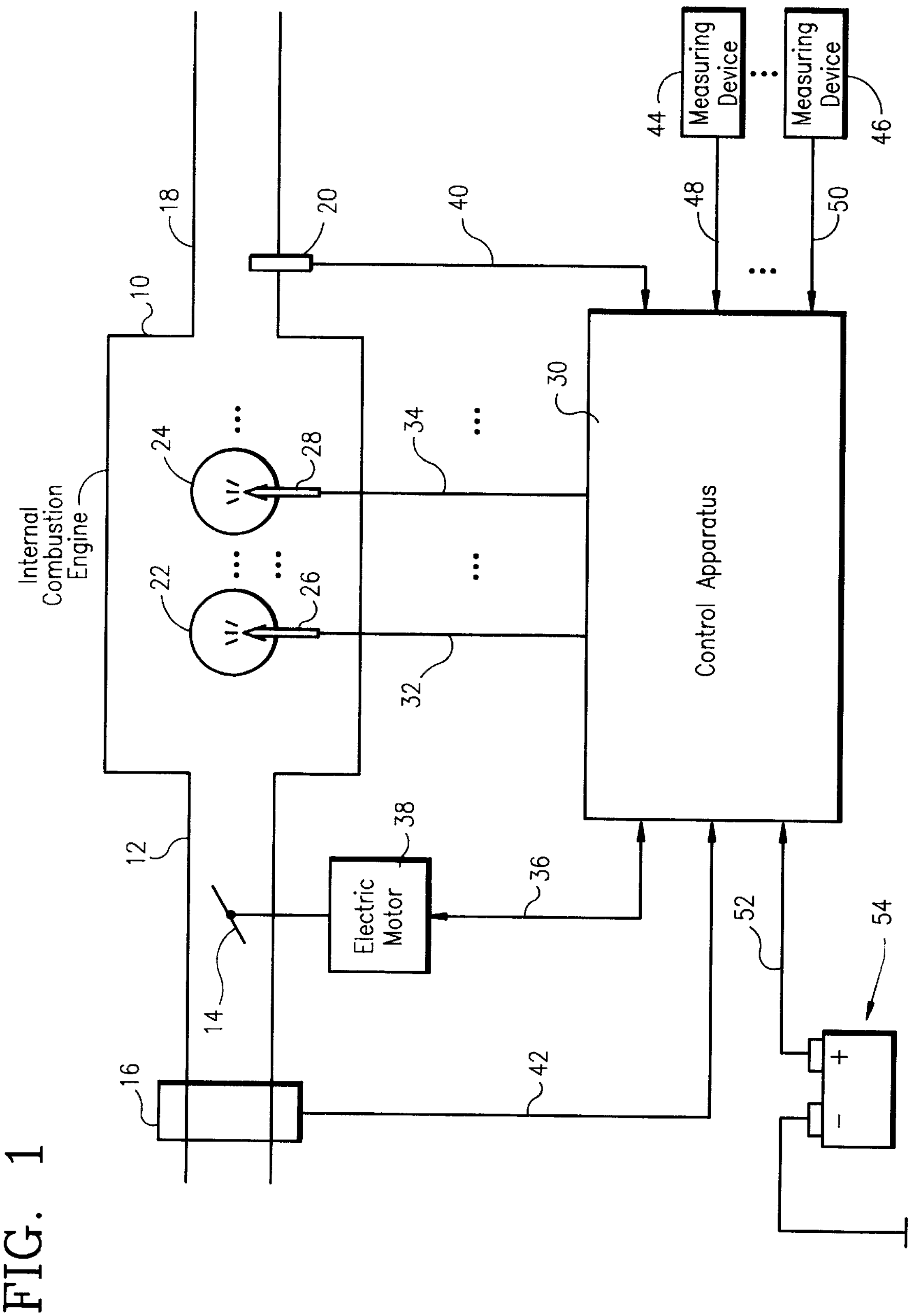
FIG. 1 is an overview block diagram of the control arrangement for the internal combustion engine.

FIG. 1 is a schematic showing an internal combustion engine 10 having an electrically actuable throttle flap 14 mounted in the intake system 12 of the engine as well as a measuring device 16 for detecting load (air mass, air quantity, intake pipe pressure). A lambda probe 20 is provided in the exhaust-gas system 18 of the engine. Injection valves 26 to 28 are provided for supplying fuel to the individual cylinders 22 to 24 of the engine 10.

An electronic control apparatus 30 is supplied with operating variables and controls the following in dependence upon these variables: injection valves 26 to 28 for metering fuel via output lines 32 to 34 of the apparatus and the throttle flap 14 via an output line 36 and an electric motor 38. In addition to influencing the metering of fuel and the air supply, the control apparatus 30 influences also the ignition angle of the engine. The exhaust-gas sensor 20 is connected to the electronic control apparatus 30 via an input line 40. A measurement signal is transmitted via the input line 40 and represents the composition of the exhaust gas. An input line 42 leads to the electronic control apparatus 30 from the measuring device for detecting load. A measurement signal representing the engine load is transmitted via the input line 42. Furthermore, measuring devices 44 to 46 are provided and are connected via input lines 48 to 50, respectively, to the electronic control apparatus 30. Further operating variables of the engine and/or the motor vehicle are transmitted from these measuring devices. These operating variables are, for example, the engine rpm, the engine temperature, the driver command et cetera and are transmitted to the electronic control apparatus 30 via lines 48 to 50, respectively. The electronic control apparatus 30 is supplied via a further input line 52 with a signal representing the battery voltage of at least one battery 54 of the motor vehicle.

The following describes basically the formation of the injection pulse.

An air/fuel mixture signal is determined by means of a characteristic field on the basis of the load signal and the engine rpm. This air/fuel mixture signal is corrected to provide an effective injection time while considering the desired value for the air/fuel ratio, the wall film correction as well as the controller intervention of the mixture controller. The effective injection time is then converted to the actual injection time by means of a battery-voltage correction in which the performance of the injection valve is considered. This injection time is outputted to the individual injection valves.

Errors can influence the formation of the effective injection time and therefore the engine torque (these errors are in the detection of load, in the mixture control loop or in the signal processing control apparatus). To detect these errors, the determined effective injection time is compared to the air/fuel mixture signal for forming a theoretical λ-value. This theoretical λ-value is compared to the desired value for the air/fuel ratio. An error is detected when there is no coincidence. An error in the battery voltage correction is principally detected in that the time difference between the actual injection time and the effective injection time is compared to a pregiven limit value. The error is detected when this limit value is exceeded.

Preferred embodiments will be described with respect to the flowcharts of FIGS. 2 to 4.

Figure 2:
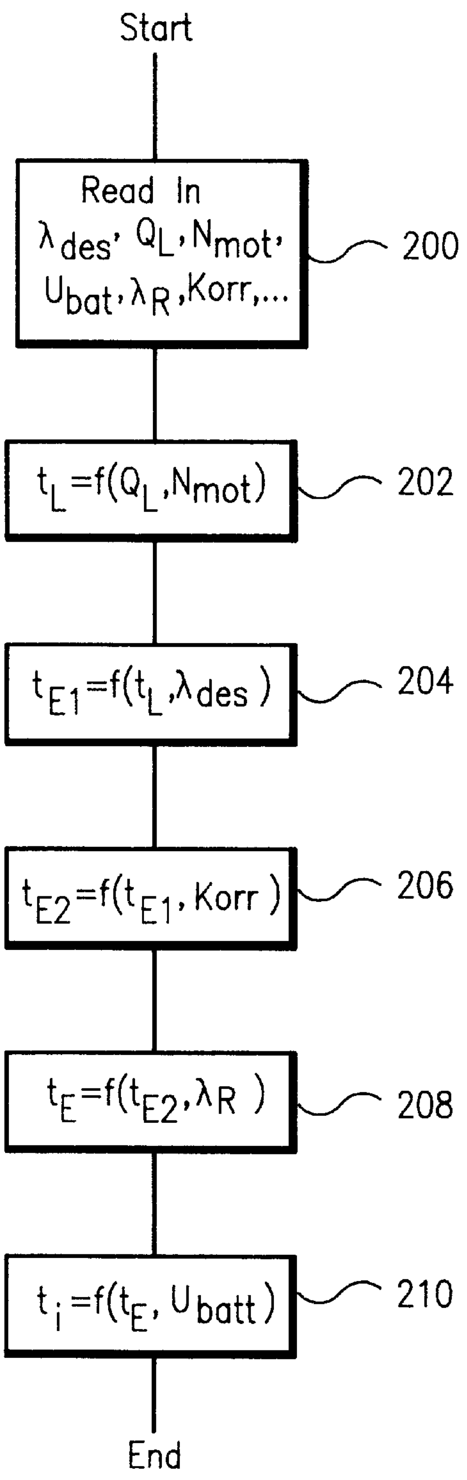
FIG. 2 is a flowchart showing the computation of the actual drive time of the injection valves.

The computation of the actual drive time of the injection valves is made clear with respect to the flowchart shown in FIG. 2.

After the start of the subprogram and at pregiven time points, the operating variables used for the correction of the actual drive time are read in in the first step 200. These operating variables include: the desired value λdes for the mixture composition, the load signal QL, the engine rpm Nmot, the battery voltage Ubatt, the output signal $\lambda_R$ of a mixture controller, a wall-film corrective value KORR, which, in accordance with the state of the art, is determined in the context of another subprogram, et cetera.

In the next step 202, the air/fuel mixture signal $T_L$ is formed on the basis of a preprogrammed characteristic field from the load signal $Q_L$ and the engine rpm $N_{mot}$. Thereafter, in the next step 204, the air/fuel mixture signal $T_L$ is corrected with the desired value for the air/fuel composition $\lambda_{des}$ ($t_{E1}$). This takes place, preferably, in the context of a multiplication. For example, for a desired value λ=1.5, the determined air/fuel mixture signal $t_L$ is multiplied by the factor 1.5.

Correspondingly, in the next step 206, the first corrected air/fuel mixture value is corrected for the second time ($t_{E2}$) with the wall-film corrective factor.

In the next step 208, the effective injection time $t_E$ is formed, preferably by multiplicative intervention, on the basis of the twice corrected air/fuel mixture signal value as well as the output signal value of the mixture control $\lambda_R$. The effective injection time $t_E$ defines the fuel quantity to be physically injected under the given conditions. This fuel quantity is corrected in the context of the next step 210 with the actual battery voltage $U_{batt}$ to provide the actual drive time $t_i$ of the valve. This considers the electrical performance of the valve with respect to the background of the actual voltage supplied. Thereafter, the subprogram is ended and repeated at a pregiven time.

Step 204 can be omitted if the vehicle is driven exclusively with a stoichiometric mixture.

Errors in the detection of load or, for example, in the mixture control loop can lead to an increased effective injection time or to a drive time for the injection valves which is too great and therefore to an excessive fuel quantity. This is especially the case for internal combustion engines which are driven with a lean mixture. The excessive fuel quantity does not correspond to the desired value pregiven for the particular mixture composition for corresponding air supply. An increased engine torque can be the result.

In normal operation, the air/fuel mixture signal $t_L$ is proportional to the fuel quantity which is required for a stoichiometric operation of the engine. If the ratio is formed from the effective injection time $t_E$ and the air/fuel mixture signal $t_L$, then a theoretical λ-value is determined. This theoretical λ-value is compared to the pregiven λ desired value. If no coincidence is detected, then the conclusion can be drawn that an error is present in the air/fuel mixture signal and/or in the mixture control loop or in parts of the signal processing in the control apparatus. If such an error is detected, suitable error reactions are initiated such as cutting off the metering of fuel to all or to selected cylinders, limiting the air supply or switching off the electrical drive of the throttle flap and/or the indication of the error via a warning lamp or storage of the fault in a memory et cetera.

Figure 3:
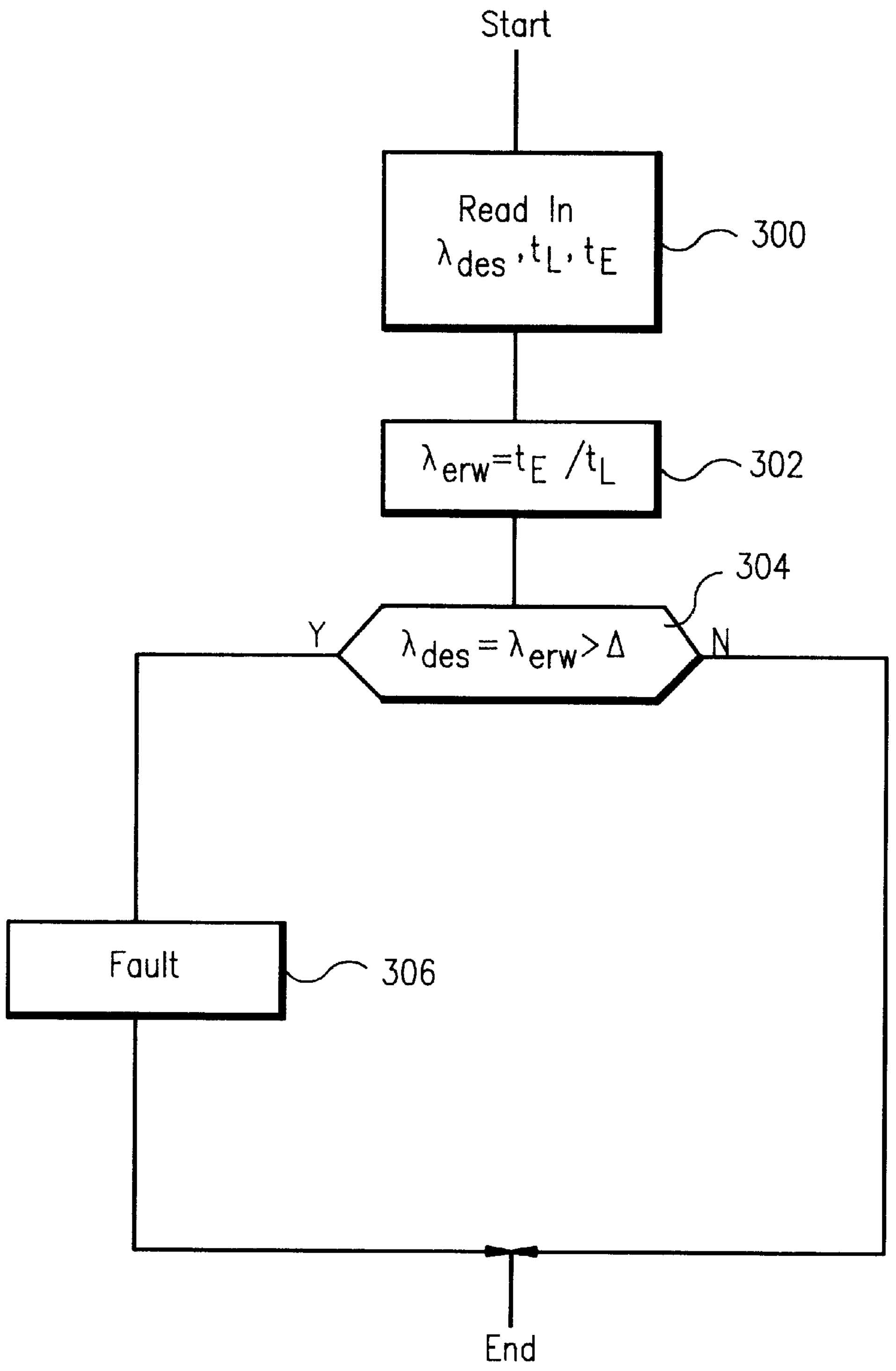
FIG. 3 is a flowchart showing a preferred procedure of the invention for error detection; and, FIG. 4 is a flowchart showing still another embodiment of the method of the invention.

A preferred procedure for detecting errors is shown with respect to the flowchart of FIG. 3.

After the start of the subprogram, at pregiven time points, the determined air/fuel mixture signal $t_L$ as well as the computed effective injection time $t_E$ are read in in the first step 300. Furthermore, the desired composition $\lambda_{des}$ of the fuel mixture, which is pregiven by the control apparatus, is read in for the actual operating state.

Thereafter, a theoretical lambda value $\lambda_{erw}$ is determined by forming a ratio in step 302 between the effective injection time $t_E$ and the air/fuel mixture signal $t_L$. Also, other mathematical methods can be utilized to form a ratio in addition to the quotient formation of the two signals shown in FIG. 3. For example, the percentage deviation between the signal values can be determined and the lambda value $\lambda_{erw}$ can be derived therefrom.

In the next inquiry step 304, the desired value $\lambda_{des}$ for the mixture composition, which is determined by the control apparatus, is compared to the theoretical value $\lambda_{erw}$. In the preferred embodiment, this is shown in step 304 by the formation of the difference between the two values and the comparison to a pregiven tolerance value Δ. In this tolerance value, the tolerances, which are present in the course of the computation chain from the air/fuel mixture signal to the effective injection time, are considered. In addition, any mathematical method which determines coincidences between the two values can be used. If a coincidence between desired and theoretical values is present, then the subprogram is ended and can be repeated at a given time because it is assumed that the control apparatus functions without error. If the two values deviate from each other (preferably after several program runthroughs or after an elapse of a filter time) impermissibly from each other, then, in accordance with step 306, it can be assumed that an error is present in the area of the air/fuel mixture signal formation or of the mixture control loop and corresponding measures for emergency operation or the output of a fault information is initiated. After step 306, the subprogram is ended and repeated at a predetermined time.

If the battery voltage correction of the effective injection time is defective, then this error can lead to a longer opening time of the injection valve and therefore to an increased engine torque. For this reason, it is necessary to also detect this error.

In the context of the solution of the invention, errors in the battery voltage correction of the injection time are determined by comparing the time difference between the actual drive time $t_i$ of the injection valves and the effective injection time $t_E$ to a pregiven limit value. The difference between the two injection time values can at most correspond to the largest possible value of the battery voltage correction.

In the normal case, the largest possible correction is permitted only at rpms below a predetermined rpm value (such as 1000 rpm) because, in this rpm range, the battery voltage can drop off intensely (for example, by switching in loads during idle) as long as the generator operates properly. In contrast, at higher rpms, only a small battery voltage correction is permissible. If however, the generator or the V-belt is defective, a maximum battery voltage correction even at higher rpms can occur corresponding to the range of lower rpms so that, in this case, even at higher rpms, the largest possible corrective value can be permitted. For this reason, and according to the invention, at rpms below the limit rpm, the comparison of the time difference to a pregiven maximum value can be carried out. At rpms above the limit rpm, the difference is compared to a limit value which, if required, changes from a start value in small steps in dependence upon time until it has reached the largest possible value. In this way, an error is detected in the range of low rpms when the time difference is greater than the largest possible correction value. At higher rpms, an error is detected when a sudden voltage correction greater than the limit value takes place. If the battery voltage drops slowly (defect of generator or V-belt), the limit value is increased slowly to the maximum value so that even at high rpms, an error is detected when the largest possible maximum value of the correction is reached.

Figure 4:
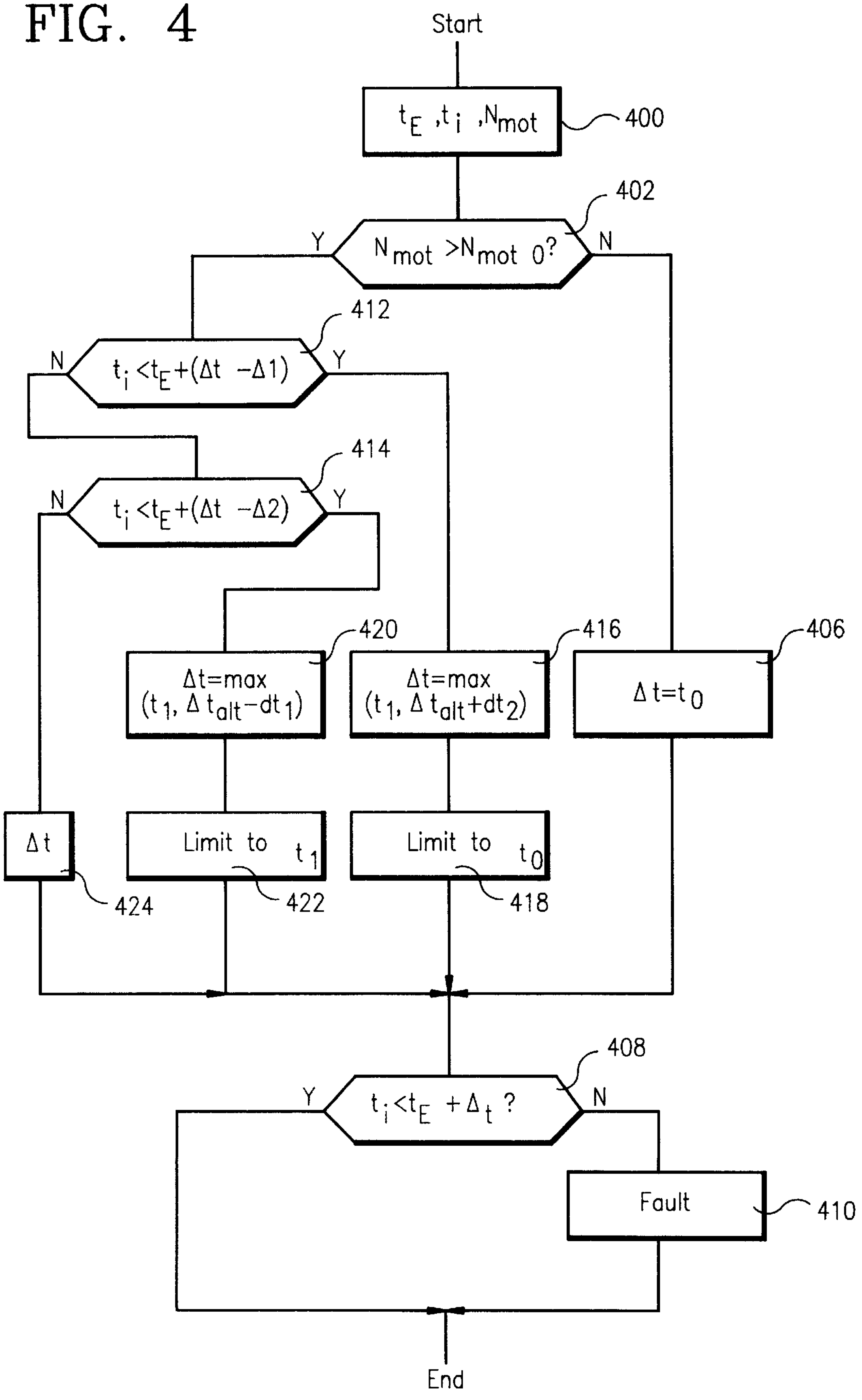

A flowchart is shown in FIG. 4 which makes clear the solution provided by the invention.

After the start of the subprogram shown, at pregiven time points, in the first step 400, the following are read in: the effective injection time $t_E$, the actual drive time $t_i$ and the engine rpm $N_{mot}$. In the next inquiry step 402, a check is made as to whether the engine rpm is in the range of higher rpms, that is, whether the engine rpm $N_{mot}$ exceeds a limit value $N_{mot0}$ which is 1000 rpm in the preferred embodiment. If this is not the case, then in step 406, the limit value Δt is set to a maximum permissible value $t_0$ (3 msec in the preferred embodiment). In the next step 408, a comparison of the time difference ($t_i$–$t_E$) between the actual drive time and the effective injection time to the pregiven limit value Δt takes place. If the time difference drops below this limit value, then it can be assumed that the battery voltage correction is free of error and the subprogram is ended and repeated at a pregiven time. If the difference exceeds this pregiven limit value, then according to step 410, it can be assumed that there is an error in the battery voltage correction and an error information is outputted and/or an emergency operation initiated.

If the rpm is in the range of higher rpms, that is, if the rpm exceeds the limit value $N_{mot0}$, then a check is made in the next step 412 as to whether the difference between the actual and effective injection time lies close to the applicable limit value Δt. For this purpose, in the preferred embodiment, the difference is compared to the limit value Δt reduced by the value Δ1. If this is not the case, then a check is made in step 410 as to whether the difference between the actual and effective injection time lies far below the applicable limit value Δt. For this purpose, and in the preferred embodiment, the difference is compared to the limit value Δt reduced by the value Δ2, which is greater than the value Δ1.

If the difference between the actual and effective injection time lies close to the limit value Δt, then, in step 416, the time-dependent changing limit value Δt is formed as the maximum value of a minimum limit value (start value, preferably 0.5 msec) and a time-dependent changing component. The time-dependent changing component is computed from the limit value $\Delta t_{alt}$ of the previous program runthrough and increased by a pregiven increment value $dt_2$. Thereafter, the time-dependent changing limit value Δt is limited in step 418 to the limit value $t_0$ and the program continues with step 408. The time-dependent change of the limit value Δt is pregiven in such a manner that, for defective generator or V-belt, no error is detected.

If step 414 yields that the difference between the actual and effective injection time is far below the applicable limit value Δt, then, in step 420, the time-dependent changing limit value Δt is formed as the maximum value of the minimum limit value $t_1$ (start value, preferably 0.5 msec) and a time-dependent changing component. The time-dependent changing component is computed from the limit value $\Delta t_{alt}$ of the previous program runthrough, reduced by a pregiven decrement value $dt_1$. Thereupon, the time-dependent changing limit value Δt is limited in step 422 to a minimum limit value $t_1$ and the program continues with step 408. The time-dependent change of the limit value Δt is preferably pregiven in that the change in the negative direction is faster than in the other direction ($dt_1 > dt_2$).

If the difference is neither close to the applicable limit value Δt according to step 412 nor far below the applicable limit value Δt, then, according to step 414, the applicable limit value Δt is maintained unchanged in step 424 and the subprogram is continued with step 408.

It is understood that the foregoing description is that of the preferred embodiments of the invention and that various changes and modifications may be made thereto without departing from the spirit and scope of the invention as defined in the appended claims.

What is claimed is:

1. A method for controlling an internal combustion engine which includes a fuel-metering device and a battery, the method comprising the steps of:

detecting a load signal (QL) and a voltage quantity (Ubatt) representing the voltage of said battery;

forming a first injection time (tE) in dependence upon at least said load signal (QL);

correcting said first injection time (tE) in dependence upon said voltage quantity (Ubatt) to obtain a second injection time (ti);

comparing said first injection time (tE) to said second injection time (ti); and, detecting a fault condition and/or initiating at least one fault reaction when said first injection time (tE) and said second injection time (ti) deviate from each other by a predetermined deviation (Δt).

2. The method of claim 1, further comprising the step of detecting a fault and initiating at least one fault reaction when the difference between said first injection time and the corrected injection time, which is actually outputted, exceeds a maximum permissible value.

3. A method for controlling an internal combustion engine including a mixture controller, the method comprising:

detecting the load on the engine and at least one additional operating variable of the engine including: battery voltage, desired air/fuel ratio, control signal of said mixture controller and a wall-film corrective value;

determining a first injection time in dependence upon the detected load;

correcting said first injection time in dependence upon said at least one operating variable to obtain a second injection time;

detecting a fault condition and/or initiating at least one fault reaction when said first and second injection times deviate impermissibly from each other;

forming a ratio from a air/fuel mixture signal derived from the load signal and said second injection time; and, comparing said ratio to a desired ratio which is dependent upon the pregiven value of the air/fuel ration.

4. A method for controlling an internal combustion engine including a mixture controller, the method comprising:

detecting the load on the engine and at least one additional operating variable of the engine including: battery voltage, desired air/fuel ratio, control signal of said mixture controller and a wall-film corrective value;

determining a first injection time in dependence upon the detected load;

correcting said first injection time in dependence upon said at least one operating variable to obtain a second injection time;

detecting a fault condition and/or initiating at least one fault reaction when said first and second injection times deviate impermissibly from each other; and, concluding that a fault is present in the detection of said load or a fault is present in the mixture control loop when said first and second air/fuel ratios are not coincident.

5. A method for controlling an internal combustion engine including a mixture controller, the method comprising:

detecting the load on the engine and at least one additional operating variable of the engine including: battery voltage, desired air/fuel ratio, control signal of said mixture controller and a wall-film corrective value;

determining a first injection time in dependence upon the detected load;

correcting said first injection time in dependence upon said at least one operating variable to obtain a second injection time;

detecting a fault condition and/or initiating at least one fault reaction when said first and second injection times deviate impermissibly from each other; and, utilizing the injection time which differs from the injection pulse outputted to the valve in that said injection time includes no correction dependent upon battery voltage.

6. A method for controlling an internal combustion engine including a mixture controller, the method comprising:

detecting the load on the engine and at least one additional operating variable of the engine including: battery voltage, desired air/fuel ratio, control signal of said mixture controller and a wall-film corrective value;

determining a first injection time in dependence upon the detected load;

correcting said first injection time in dependence upon said at least one operating variable to obtain a second injection time;

detecting a fault condition and/or initiating at least one fault reaction when said first and second injection times deviate impermissibly from each other;

detecting a fault and initiating at least one fault reaction when the difference between said first injection time and the corrected injection time, which is actually outputted, exceeds a maximum permissible value; and, said maximum permissible difference being dependent upon the engine rpm in that a greater difference is permissible at lower engine rpms.

7. The method of claim 6, wherein said maximum permissible difference is adaptively changed.

8. The method of claim 7, wherein the adaptive change takes place by:

first making only a small difference permissible; and, increasing this permissible difference in small steps when the determined difference between the outputted injection time and the computed injection time approaches the maximum permissible difference.

9. The method of claim 8, further comprising the step of reducing the maximum permissible difference to a low value when the difference between the outputted injection time and the effective injection time is significantly smaller than the instant applicable limit value.

10. A method for controlling an internal combustion engine having a mixture controller, the method comprising the steps of:

detecting a load signal (QL);

detecting a control signal (λR) of said mixture controller, which is formed on the basis of a measured air/fuel ratio and a desired air/fuel ratio (λdes);

determining a charge signal (tL) in dependence upon said load signal (QL);

determining an injection time (tE) in dependence upon said charge signal (tL) and at least said control signal (λR) of said mixture controller;

determining an air/fuel ratio (λerw), which is to be expected, on the basis of said injection time (tE) and said charge signal (tL);

comparing said air/fuel ratio (λerw) to said desired air/fuel ratio (λdes); and, recognizing a fault situation and/or initiating at least a fault reaction when said desired air/fuel ratio (λdes) and said air/fuel ratio (λerw), which is to be expected, deviate from each other by more than a predetermined deviation (Δ).

11. An arrangement for controlling an internal combustion engine equipped with a battery and a fuel-metering device, the arrangement comprising:

a first measuring device for detecting a first signal (QL) representing a load;

a second measuring device for detecting the voltage of said battery and supplying a second signal (Ubatt) representative of said battery voltage;

a control apparatus being connected to said measuring devices for receiving said first and second signals (QL, Ubatt);

said control apparatus including means for determining a first injection time (tE) on the basis of said first signal (QL) and for correcting said first injection time (tE) on the basis of said second signal (Ubatt) in order to obtain a second injection time (ti); and, said control apparatus further including:

means for comparing said first and second injection times (tE, ti) to each other;

comparator means for comparing said first and second injection times (tE, ti) to each other; and, means for recognizing a fault condition and/or for initiating a fault measure when said first injection time (tE) and said second injection time (ti) deviate from each other by more than a predetermined deviation ($\Delta t$).

12. An arrangement for controlling an internal combustion engine having a mixture controller, the arrangement comprising:

a control apparatus including means for detecting a load signal (QL) and means for detecting the output signal ($\lambda R$) of said mixture controller;

said control apparatus further including:

means for forming a charge signal (tL) on the basis of said load signal (QL);

means for correcting said charge signal (tL) with said output signal ($\lambda R$) of said mixture controller to form an injection signal representing the injection time (tE);

means for forming an air/fuel ratio ($\lambda erw$), which is to be expected, on the basis of said charge signal (tL) and said injection time (tE); and, means for recognizing a fault situation and/or initiating at least a fault reaction when said desired air/fuel ratio ($\lambda des$) and said air/fuel ratio ($\lambda erw$), which is to be expected, deviate from each other by more than a predetermined deviation ($\Delta$).

* * * * *